US 8,638,484 B2

(12) United States Patent
Nagata et al.

(10) Patent No.: US 8,638,484 B2
(45) Date of Patent: Jan. 28, 2014

(54) ERECTING EQUAL-MAGNIFICATION LENS ARRAY PLATE, OPTICAL SCANNING UNIT, IMAGE READING DEVICE, AND IMAGE WRITING DEVICE

(75) Inventors: Hideshi Nagata, Minato-ku (JP); Katsuhide Shimmo, Minato-ku (JP); Shiro Sato, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 135 days.

(21) Appl. No.: 13/413,248

(22) Filed: Mar. 6, 2012

(65) Prior Publication Data
US 2012/0229878 A1 Sep. 13, 2012

(30) Foreign Application Priority Data
Mar. 7, 2011 (JP) .................. 2011-049384

(51) Int. Cl.
*G02B 26/08* (2006.01)
(52) U.S. Cl.
USPC ....................... 359/201.1; 359/622
(58) Field of Classification Search
USPC ........... 359/196.1, 201.1, 207.1–207.11, 662, 359/741–743
See application file for complete search history.

(56) References Cited

U.S. PATENT DOCUMENTS
2012/0120462 A1* 5/2012 Nagata ................... 358/475

FOREIGN PATENT DOCUMENTS
JP 2009-069801 A 4/2009

* cited by examiner

*Primary Examiner* — James Phan
(74) *Attorney, Agent, or Firm* — Sughrue Mion, PLLC

(57) ABSTRACT

An erecting equal-magnification lens array plate includes: a first lens array plate provided with a plurality of first lenses arranged on a first surface and a plurality of second lenses arranged on a second surface; and a second lens array plate provided with a plurality of third lenses arranged on a third surface and a plurality of fourth lenses arranged on a fourth surface. The first and second lens array plates are stacked. An intermediate light-shielding member provided with a plurality of intermediate through holes is between the first lens array plate and the second lens array plate. The intermediate through hole is formed such that the hole diameter is progressively smaller in a tapered fashion away from the second surface toward the third surface. A plurality of V grooves are formed in an area between adjacent second lenses on the second surface.

21 Claims, 17 Drawing Sheets

FIG.16

| | No. | W/ OR W/O V GROOVES | V GROOVE WIDTH [μm] | ANGLE OF INCLINATION ε [°] | V GROOVE HEIGHT [μm] | NOISE RATIO [%] W1=0.5mm | NOISE RATIO [%] W1=200mm |
|---|---|---|---|---|---|---|---|
| COMPARATIVE EXEMPLARY EMBODIMENT | 1 | W/O | - | - | - | 1.07 | 1.07 |
| EXEMPLARY EMBODIMENT | 2 | W/ | 5 | 60 | 4.3 | 0.38 | 0.38 |
| | 3 | W/ | 5 | 45 | 2.5 | 0.90 | 0.90 |
| | 4 | W/ | 10 | 60 | 8.7 | 0.38 | 0.38 |
| | 5 | W/ | 10 | 45 | 5 | 0.44 | 0.44 |

ERECTING EQUAL-MAGNIFICATION LENS ARRAY PLATE, OPTICAL SCANNING UNIT, IMAGE READING DEVICE, AND IMAGE WRITING DEVICE

BACKGROUND OF THE INVENTION

1. Field of the Invention

The present invention relates to an erecting equal-magnification lens array plate used in image reading devices and image writing devices.

2. Description of the Related Art

Some image reading devices such as scanners are known to use erecting equal-magnification optics. Erecting equal-magnification optics are capable of reducing the size of devices better than reduction optics. In the case of image reading devices, an erecting equal-magnification optical system comprises a linear light source, an erecting equal-magnification lens array, and a linear image sensor.

A rod lens array capable of forming an erect equal-magnification image is used as an erecting equal-magnification lens array in an erecting equal-magnification optical system. Normally, a rod lens array comprises an arrangement of rod lenses in the longitudinal direction (main scanning direction of the image reading device) of the lens array. By increasing the number of rows of rod lenses, the proportion of light transmitted is improved and unevenness in the amount of light transmitted is reduced. Due to cost concerns, it is common to use one or two rows of rod lenses in an array.

Meanwhile, an erecting equal-magnification lens array plate could be formed as a stack of two transparent lens array plates built such that the optical axes of individual convex lenses are aligned, where each transparent lens array plate includes a systematic arrangement of micro-convex lenses on both surfaces of the plate. Since an erecting equal-magnification lens array plate such as this can be formed by, for example, injection molding, an erecting equal-magnification lens array can be manufactured at a relatively low cost.

An erecting equal-magnification lens array plate lacks a wall for ray separation between adjacent lenses. Therefore, there is a problem in that a light ray diagonally incident on an erecting equal-magnification lens array plate travels diagonally inside the plate and enters an adjacent convex lens, creating noise (referred to as ghost noise) as it leaves the plate.

There is known an erecting equal-magnification lens array plate in which a light-shielding member is provided between the two lens array plates in order to reduce ghost noise (see, for example, patent document No. 1).

[patent document No. 1] JP2009-069801

As described in patent document 1, ghost noise can be reduced to a certain extent merely by providing a light-shielding member between the two lens array plates. In order to form an erect equal-magnification image with higher quality, however, it is desirable to further reduce ghost noise.

SUMMARY OF THE INVENTION

The present invention addresses the aforementioned disadvantage and a purpose thereof is to provide an erecting equal-magnification lens array plate capable of improving the performance of reducing ghost noise and to provide an optical scanning unit, an image reading device, and an image writing device in which the erecting equal-magnification lens array plate is used.

To address the aforementioned problem, the erecting equal-magnification lens array plate according to an embodiment of the present invention comprises: a first lens array plate provided with a plurality of first lenses systematically arranged on a first surface and a plurality of second lenses systematically arranged on a second surface opposite to the first surface; and a second lens array plate provided with a plurality of third lenses systematically arranged on a third surface and a plurality of fourth lenses systematically arranged on a fourth surface opposite to the third surface, wherein the first lens array plate and the second lens array plate form a stack such that the second surface and the third surface face each other to ensure that a combination of the lenses aligned with each other form a coaxial lens system, and an erect equal-magnification image of an object on the first surface side is formed on an image plane facing the fourth surface. The erecting equal-magnification lens array plate further comprises an intermediate light-shielding member provided with a plurality of intermediate through holes corresponding to the second and third lenses and provided between the first lens array plate and the second lens array plate such that the intermediate through holes are located directly opposite to the corresponding second and third lenses. A plurality of V grooves are formed in an area between adjacent second lenses on the second surface and/or an area between adjacent third lenses on the third surface.

Another embodiment of the present invention also relates to an erecting equal-magnification lens array plate. The erecting equal-magnification lens array plate comprises: a first lens array plate provided with a plurality of first lenses systematically arranged on a first surface and a plurality of second lenses systematically arranged on a second surface opposite to the first surface; and a second lens array plate provided with a plurality of third lenses systematically arranged on a third surface and a plurality of fourth lenses systematically arranged on a fourth surface opposite to the third surface, wherein the first lens array plate and the second lens array plate form a stack such that the second surface and the third surface face each other to ensure that a combination of the lenses aligned with each other form a coaxial lens system, and an erect equal-magnification image of an object on the first surface side is formed on an image plane facing the fourth surface. The erecting equal-magnification lens array plate further comprises an intermediate light-shielding member provided with a plurality of intermediate through holes corresponding to the second and third lenses and provided between the first lens array plate and the second lens array plate such that the intermediate through holes are located directly opposite to the corresponding second and third lenses. The intermediate through hole is formed such that the hole diameter is progressively smaller in a tapered fashion away from the second surface toward the third surface. A plurality of V grooves are formed in an area between adjacent second lenses on the second surface.

Still another embodiment of the present invention also relates to an erecting equal-magnification lens array plate. The erecting equal-magnification lens array plate comprises: a first lens array plate provided with a plurality of first lenses systematically arranged on a first surface and a plurality of second lenses systematically arranged on a second surface opposite to the first surface; and a second lens array plate provided with a plurality of third lenses systematically arranged on a third surface and a plurality of fourth lenses systematically arranged on a fourth surface opposite to the third surface, wherein the first lens array plate and the second lens array plate form a stack such that the second surface and the third surface face each other to ensure that a combination of the lenses aligned with each other form a coaxial lens system, and an erect equal-magnification image of an object on the first surface side is formed on an image plane facing the fourth surface. The erecting equal-magnification lens array plate further comprises an intermediate light-shielding member provided with a plurality of intermediate through holes corresponding to the second and third lenses and provided between the first lens array plate and the second lens array plate such that the intermediate through holes are located directly opposite to the corresponding second and third lenses. The intermediate through hole is formed such that the hole diameter is progressively larger in an inversely tapered fashion away from the second surface toward the third surface. A plurality of V grooves are formed in an area between adjacent third lenses on the third surface.

The V grooves may be formed to extend substantially parallel to the main scanning direction of the erecting equal-magnification lens array plate. The total width of the V grooves in the sub-scanning direction is equal to or more than an aperture size of the first lenses. The adjacent V grooves are contiguous with each other at their ends in the sub-scanning direction.

Yet another embodiment of the present invention relates to an optical scanning unit. The optical scanning unit comprises: a linear light source configured to illuminate an original to be read; the aforementioned erecting equal-magnification lens array plate configured to condense light reflected by the original to be read; and a linear image sensor configured to receive light transmitted by the erecting equal-magnification lens array plate.

Still another embodiment of the present invention relates to an image reading device. The image reading device comprises: the aforementioned optical scanning unit; and an image processing unit configured to process an image signal detected by the optical scanning unit.

Yet another embodiment of the present invention relates to an image writing device. The image writing device comprises: an LED array comprising an array of a plurality of LED's; the aforementioned erecting equal-magnification lens array plate for condensing light emitted from the LED array; and a photosensitive drum for receiving the light transmitted through the erecting equal-magnification lens array plate.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 16 shows a result of simulation in the comparative exemplary embodiment and the exemplary embodiment.

DETAILED DESCRIPTION OF THE INVENTION

The invention will now be described by reference to the preferred embodiments. This does not intend to limit the scope of the present invention, but to exemplify the invention.

Figure 1:
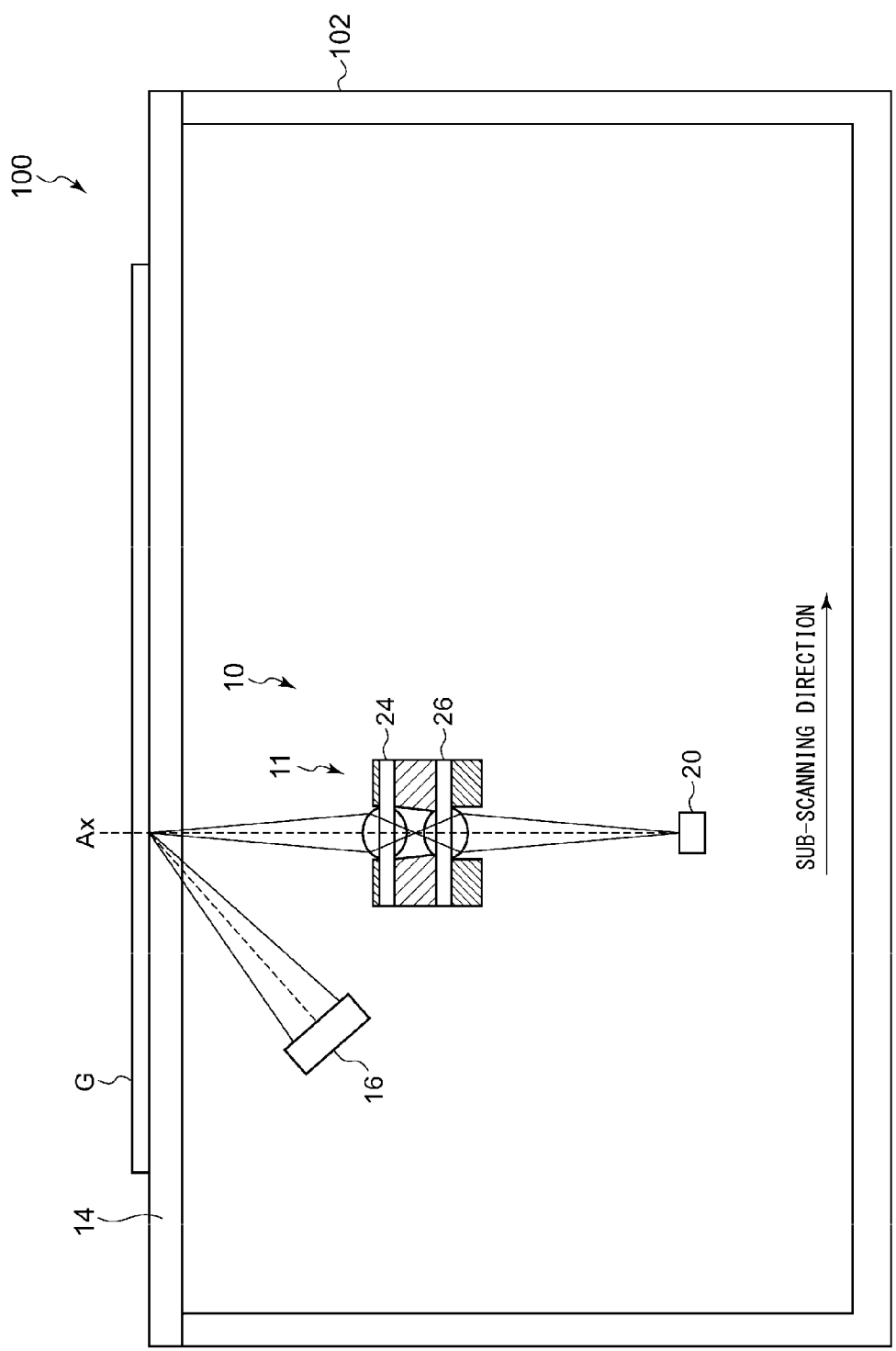
FIG. 1 shows an image reading device according to an embodiment of the present invention.

FIG. 1 shows an image reading device 100 according to an embodiment of the present invention. As shown in FIG. 1, the image reading device 100 comprises a housing 102, a glass plate 14 on which a document G is placed, an optical scanning unit 10 accommodated in the housing 102, a driving mechanism (not shown) for driving the optical scanning unit 10, and an image processing unit (not shown) for processing data read by the optical scanning unit 10.

The optical scanning unit 10 comprises a linear light source 16 for illuminating a document G placed on a glass plate 14, an erecting equal-magnification lens array plate 11 for condensing light reflected from the document G, a linear image sensor (photoelectric transducer) 20 for receiving light condensed by the erecting equal-magnification lens array plate 11, and a case (not shown) for fixing the linear light source 16, the erecting equal-magnification lens array plate 11, and the linear image sensor 20.

The linear light source 16 is a light source emitting a substantially straight light. The linear light source 16 is secured such that the optical axis thereof passes through the intersection of the optical axis Ax of the erecting equal-magnification lens array plate 11 and the top surface of the glass plate 14. The light exiting from the linear light source 16 illuminates the document G placed on the glass plate 14. The light illuminating the document G is reflected by the document G toward the erecting equal-magnification lens array plate 11.

The erecting equal-magnification lens array plate 11 comprises a stack of a first lens array plate 24 and a second lens array plate 26 built such that pairs of corresponding lenses form a coaxial lens system, where each lens array plate is formed with a plurality of convex lenses on both surfaces of the plate, as described later. The first lens array plate 24 and the second lens array plate 26 are held by a holder (not shown) in a stacked state. The erecting equal-magnification lens array plate 11 is installed in the image reading device 100 such that the longitudinal direction thereof is aligned with the main scanning direction and the lateral direction thereof is aligned with the sub-scanning direction.

The erecting equal-magnification lens array plate 11 is configured to receive linear light reflected from the document G located above and form an erect equal-magnification image on an image plane located below, i.e., a light-receiving surface of the linear image sensor 20. The image reading device 100 can read the document G by scanning document G with the optical scanning unit 10 in the sub-scanning direction.

Figure 2:
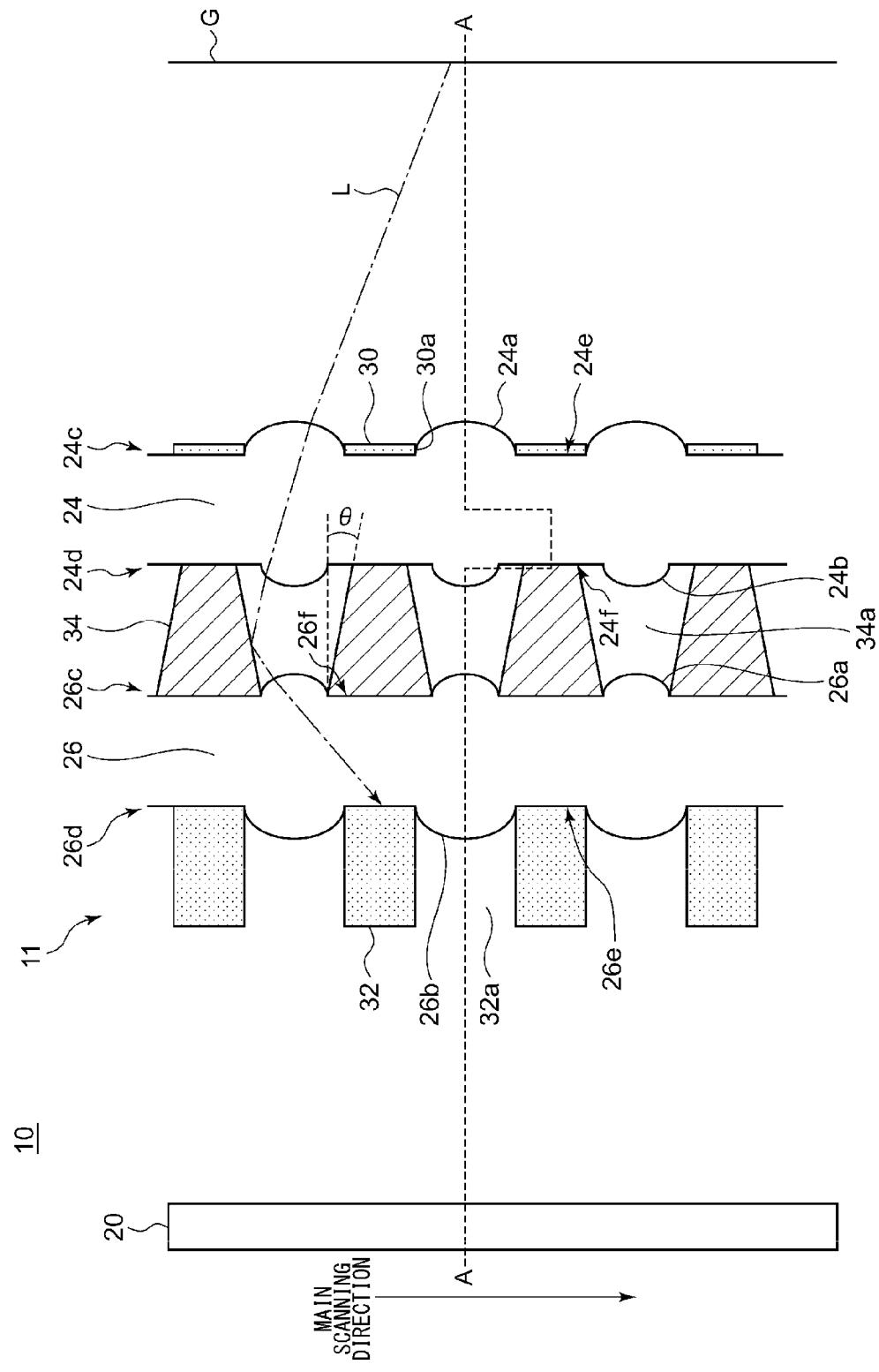
FIG. 2 shows a cross section of the optical scanning unit in the main scanning direction.

FIG. 2 shows a cross section of the optical scanning unit 10 in the main scanning direction. Referring to FIG. 2, the vertical direction in the illustration represents main scanning direction (longitudinal direction) of the erecting equal-magnification lens array plate 11 and the depth direction in the illustration represents the sub-scanning direction (lateral direction).

As described above, the erecting equal-magnification lens array plate 11 comprises a stack of the first lens array plate 24 and the second lens array plate 26. Each of the first lens array plate 24 and the second lens array plate 26 is a rectangular plate and is provided with an arrangement of a plurality of convex lenses on both sides thereof.

The first lens array plate 24 and the second lens array plate 26 are formed by injection molding. Preferably, each of the first lens array plate 24 and the second lens array plate 26 is formed of a material amenable to injection molding, having high light transmittance in a desired wavelength range, and having low water absorption. Desired materials include cycloolefin resins, olefin resins, norbornene resins, and polycarbonate.

A plurality of first lenses 24a are arranged in a single line on a first surface 24c (one of the surfaces of the first lens array plate 24) in the longitudinal direction of the first lens array plate 24. A plurality of second lenses 24b are arranged in a single line on a second surface 24d of the first lens array plate 24 opposite to the first surface 24c in the longitudinal direction of the first lens array plate 24. As shown in FIG. 2, the lens diameter of the second lenses 24b is smaller than the lens diameter of the first lenses 24a in this embodiment.

A plurality of third lenses 26a are arranged in a single line on a third surface 26c (one of the surfaces of the second lens array plate 26) in the longitudinal direction of the second lens array plate 26. A plurality of fourth lenses 26b are arranged in a single line on a fourth surface 26d opposite to the third surface 26c in the longitudinal direction of the second lens array plate 26. As shown in FIG. 2, the lens diameter of the third lenses 26a is smaller than the lens diameter of the fourth lenses 26b in this embodiment. The lens diameter of the third lenses 26a is equal to the lens diameter of the second lenses 24b, and the lens diameter of the fourth lenses 26b is equal to the lens diameter of the first lenses 24a.

In this embodiment, it is assumed that the first lens 24a, the second lens 24b, the third lens 26a, and the fourth lens 26b are spherical in shape. Alternatively, the lenses may have aspherical shapes.

The first lens array plate 24 and the second lens array plate 26 form a stack such that the second surface 24d and the third surface 26c face each other to ensure that a combination of the first lens 24a, the second lens 24b, the third lens 26a, and the fourth lens 26b aligned with each other form a coaxial lens system. In other words, the first and second lens array plates 24 and 26 form a stack such that the optical axes of the first, second, third, and fourth lenses 24a, 24b, 26a, and 26b aligned with each other are aligned.

A first surface light-shielding member 30 is provided on the first surface 24c of the first lens array plate 24. The first surface light-shielding member 30 is a member of a film form made of a light-shielding material and is formed with a plurality of first surface through holes 30a. The first surface through holes 30a are arranged in a single line in the longitudinal direction of the first surface light-shielding member 30 so as to be in alignment with the first lenses 24a of the first lens array plate 24. The hole diameter of the first surface through hole 30a is equal to the effective diameter of the first lens 24a. The first surface light-shielding member 30 is provided on the first surface 24c such that each first surface through hole 30a is located directly opposite to the corresponding first lens 24a. In other words, the first surface light-shielding member 30 is provided on the first surface 24c such that the central axis of each first surface through hole 30a is aligned with the optical axis of the corresponding first lens 24a. As shown in FIG. 2, an area 24e (hereinafter, also referred to as "first surface flat area 24e") on the first surface 24c outside the effective region of the first lenses 24a is covered by the first surface light-shielding member 30. The term "effective region of a lens" refers to a portion having the function of a lens. The first surface light-shielding member 30 shields light not contributing to imaging. The first surface light-shielding member 30 may be formed by printing the first surface 24c with a light-shielding pattern using a light-absorbing material such as black ink.

A fourth surface light-shielding member 32 is provided on the fourth surface 26d of the second lens array plate 26. The fourth surface light-shielding member 32 is a member of a plate form made of a light-shielding material and is formed with a plurality of fourth surface through holes 32a. The fourth surface through holes 32a are arranged in a single line in the longitudinal direction of the fourth surface light-shielding member 32 so as to be in alignment with the fourth lenses 26b of the second lens array plate 26. The fourth surface through hole 32a is cylindrically formed and the hole diameter thereof is equal to the effective diameter of the fourth lens 26b. The fourth surface light-shielding member 32 is provided on the fourth surface 26d such that each fourth surface through hole 32a is located directly opposite to the corresponding fourth lens 26b. In other words, the fourth surface light-shielding member 32 is provided on the fourth surface 26d such that the central axis of each fourth surface through hole 32a is aligned with the optical axis of the corresponding fourth lens 26b. As shown in FIG. 2, an area 26e (hereinafter, also referred to as "fourth surface flat area 26e") on the fourth surface 26d outside the effective region of the fourth lenses 26b is covered by the fourth surface light-shielding member 32.

Preferably, the fourth surface light-shielding member 32 may be formed by, for example, injection molding, using a light absorbing material such as black ABS resin. Alternatively, the fourth surface light-shielding member 32 may be formed by stacking a black resin paint.

In this specification, the first surface light-shielding member 30 is configured in a "film form" and the fourth surface light-shielding member 32 is configured in a "plate form". This means that the first surface light-shielding member 30 is far thinner than the fourth surface light-shielding member 32. In other words, the term "film form" means that the thickness is negligibly small.

As shown in FIG. 2, an intermediate light-shielding member 34 is provided between the first lens array plate 24 and the second lens array plate 26. The intermediate light-shielding member 34 is a member of a plate form made of a light-shielding material and is formed with a plurality of intermediate through holes 34a. The intermediate through holes 34a are arranged in a single line in the longitudinal direction of the intermediate light-shielding member 34 so as to be in alignment with the second lenses 24b and the third lenses 26a. In this embodiment, the intermediate through hole 34a is formed as a circular truncated cone such that the hole diameter is progressively smaller in a tapered fashion away from the second surface 24d toward the third surface 26c. The intermediate light-shielding member 34 is provided between the first lens array plate 24 and the second lens array plate 26 such that each intermediate through hole 34a is located directly opposite to the corresponding second lens 24b and the third lens 26a. In other words, the intermediate light-shielding member 34 is provided between the first lens array plate 24 and the second lens array plate 26 such that the central axis of each intermediate through hole 34a is aligned with the optical axis of the corresponding second lens 24b and third lens 26a.

As shown in FIG. 2, the second surface inter-lens area 24f and the third surface inter-lens area 26f are covered by the intermediate light-shielding member 34. As described above, the intermediate through hole 34a of the intermediate light-shielding member 34 is formed as a circular truncated cone such that the hole diameter is progressively smaller in a tapered fashion away from the second surface 24d toward the third surface 26c. Therefore, the third surface inter-lens area 26f is completely covered by the intermediate light-shielding member 34, but the second surface inter-lens area 24f is not completely covered by the intermediate light-shielding member 34. A part of the second surface inter-lens area 24f is exposed.

For example, the intermediate light-shielding member 34 may be formed by, for example, injection molding, using a light absorbing material such as black ABS resin. Alternatively, the intermediate light-shielding member 34 may be formed by stacking a black resin paint.

The intermediate through hole 34a is formed as a circular truncated cone in order to reduce flare noise. The intermediate light-shielding member 34 has the function of reducing ghost noise by shielding rays diagonally traveling in the first lens array plate 24. However, the ray incident on the interior wall surface of the intermediate through hole 34a is not completely absorbed even if a light absorbing material is used. The ray is partly reflected by the interior wall surface (Fresnel reflection).

If the intermediate through hole of the intermediate light-shielding member 34 is formed as a cylinder instead of a circular truncated cone as in this embodiment, the ray reflected by the interior wall of the intermediate through hole might be incident on the linear image sensor 20 after being transmitted through the second lens array plate 26, creating flare noise.

FIG. 2 shows an optical path of a ray L (chain line) emitted from a point on the document G, in order to illustrate how flare noise is removed in the erecting equal-magnification lens array plate 11 according to this embodiment. In this embodiment, the intermediate through hole 34a is formed as a circular truncated cone such that the hole diameter is progressively smaller in a tapered fashion away from the second surface 24d toward the third surface 26c. In other words, the interior wall surface of the intermediate through hole 34a is inclined with respect to the optical axis Ax of the lens. Due to the inclination of the interior wall surface, the angle of reflection of the ray at the interior wall surface of the intermediate through hole 34a is smaller than when the intermediate through hole is formed as a cylinder. The angle of reflection is defined as an angle formed by the normal to the interior wall surface and the reflected ray. Denoting the angle of inclination of the interior wall surface with respect to the optical axis Ax by $\theta$, it is ensured that the angle of reflection of the ray L is smaller by $2\theta$ than the angle of reflection occurring when the intermediate through hole is formed as a cylinder by tapering the interior wall surface by $\theta$ with respect to the optical axis Ax. Due to the smaller angle of reflection, the ray L impinges on the fourth surface light-shielding member 32 and so is shielded or at least attenuated. Therefore, according to this embodiment, the ray L1 does not substantially reach the linear image sensor 20 so that flare noise is prevented.

Figure 3:
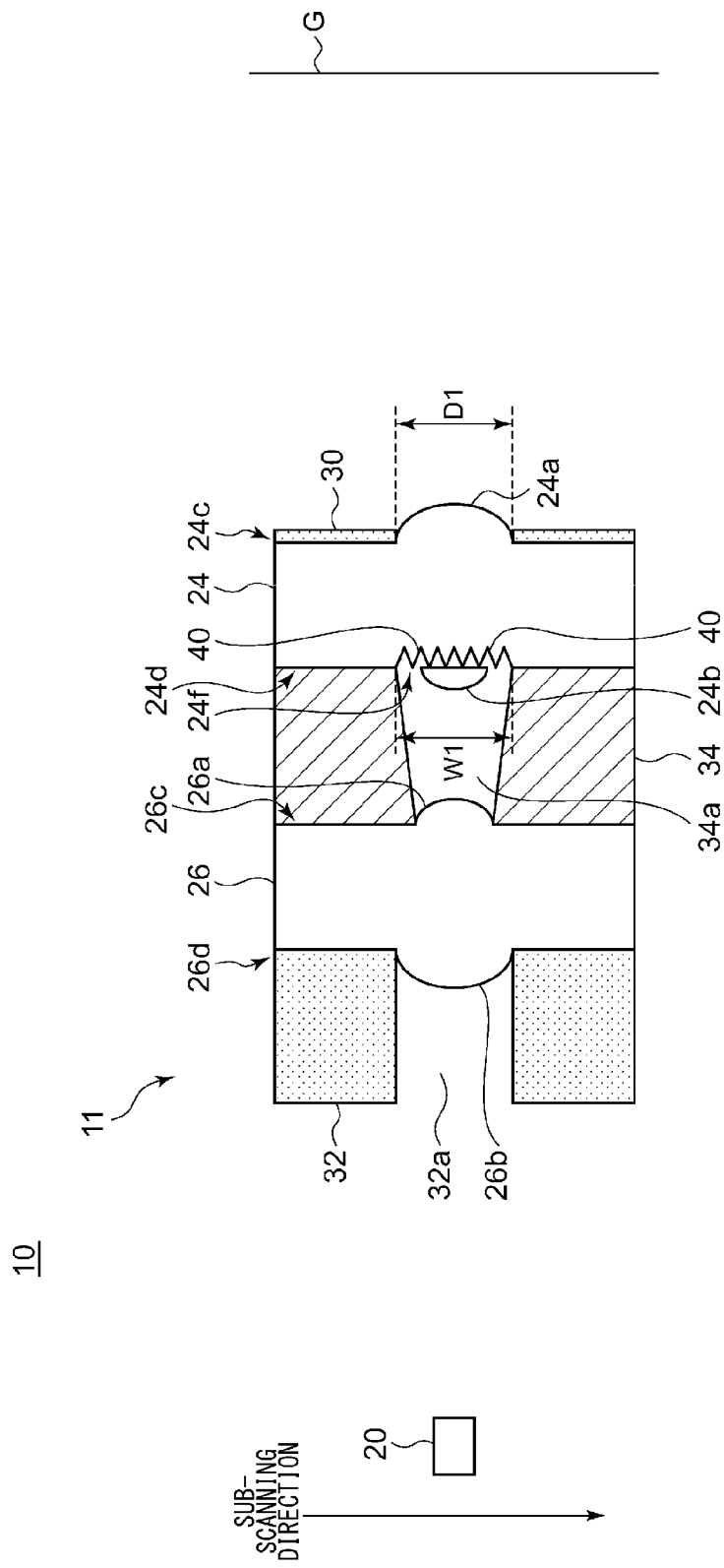
FIG. 3 shows a cross section of the erecting equal-magnification lens array plate along A-A in FIG. 2.
Figure 4:
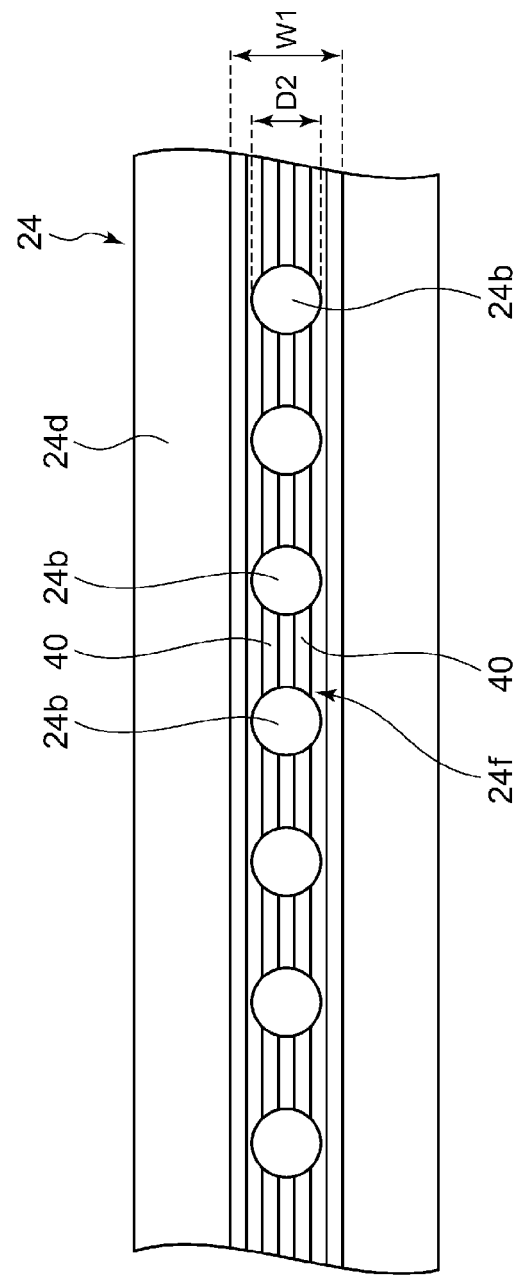
FIG. 4 is a front view of the second surface of the first lens array plate.

FIG. 3 is a cross section of the erecting equal-magnification lens array plate 11 along A-A in FIG. 2. Referring to FIG. 3, the vertical direction in the illustration represents sub-scanning direction (lateral direction) of the erecting equal-magnification lens array plate 11 and the depth direction in the illustration represents the main scanning direction (longitudinal direction). FIG. 4 is a front view of the second surface 24d of the first lens array plate 24. The feature of the erecting equal-magnification lens array plate 11 according to the embodiment is found in an area 24f (hereinafter, "second surface inter-lens area 24f") between adjacent second lenses 24b on the second surface 24d of the first lens array plate 24. Therefore, the A-A line of FIG. 2 is drawn such that a part thereof passes through the second surface inter-lens area 24f. In the embodiment, an area 26f (hereinafter, "third surface inter-lens area 26f") between adjacent third lenses 26a on the third surface 26c of the second lens array plate 26 is formed as a flat surface.

As shown in FIGS. 3 and 4, the second surface inter-lens area 24f is formed with a plurality of V grooves 40 in the embodiment. The V grooves 40 have a function of deflecting light incident on the second surface inter-lens area 24f in the sub-scanning direction of the erecting equal-magnification lens array plate 11. The direction of deflection can be controlled by changing the angle of inclination of the slope of the V grooves 40.

As shown in FIGS. 3 and 4, the plurality of V grooves 40 are formed to extend substantially parallel to the main scanning direction of the erecting equal-magnification lens array plate 11. The V grooves 40 are arranged such that adjacent V grooves are contiguous with each other at their ends in the sub-scanning direction. The V grooves 40 may be provided by forming the second surface 24d with concave portions having a triangular cross section or forming the second surface 24d with convex portions having a triangular cross section.

The erecting equal-magnification lens array plate 11 as configured above is built in the image reading device 100 such that the distance from the first lens 24a to the document G and the distance from the fourth lens 26b to the linear image sensor 20 are equal to a predetermined working distance.

A description will now be given of the operation of the erecting equal-magnification lens array plate 11 according to the embodiment. Before describing the operation of the erecting equal-magnification lens array plate 11, a comparative embodiment will be shown.

Figure 5:
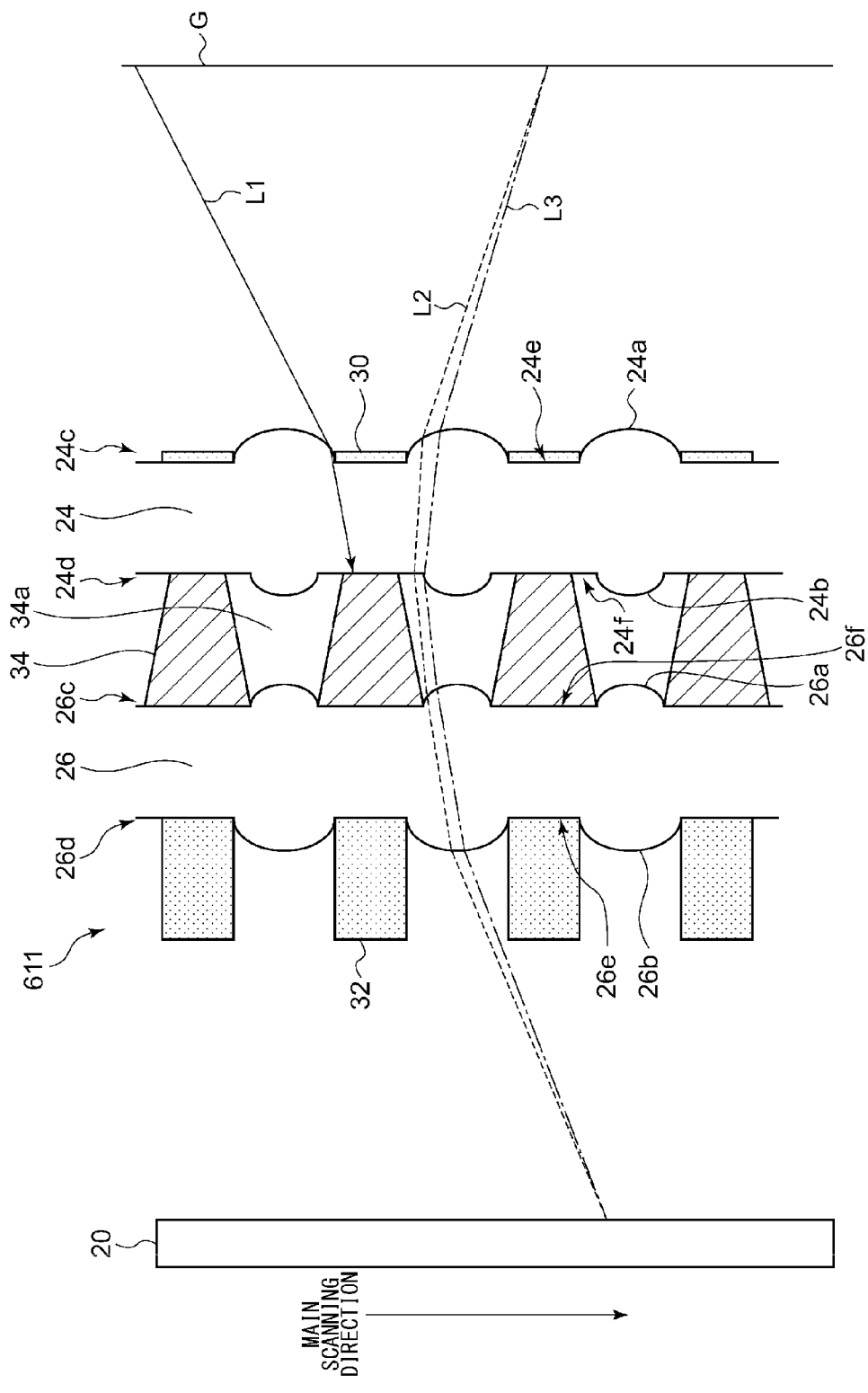
FIG. 5 shows a cross section of the erecting equal-magnification lens array plate according to the comparative embodiment in the main scanning direction.

FIG. 5 shows a cross section of an erecting equal-magnification lens array plate 611 according to a comparative embodiment in the main scanning direction. In the erecting equal-magnification lens array plate 611 according to the comparative embodiment, the second surface inter-lens area 24f is formed as a flat surface. The other aspects are identical to those of the erecting equal-magnification lens array plate 11 according to the embodiment shown in FIG. 2.

FIG. 5 shows optical paths of a ray L1 (solid line), a ray L2 (broken line), and a ray L3 (chain line) emitted from the document G. The rays L1-L3 are diagonally incident on the erecting equal-magnification lens array plate 611.

Much of the ray diagonally incident on the erecting equal-magnification lens array plate 611 is absorbed or at least attenuated by the intermediate light-shielding member 34, as represented by the ray L1. However, since a part of the second surface inter-lens area 24f is exposed, the rays such as the rays L2 and L3 transmitted through the exposed portion may not be shielded by the intermediate light-shielding member 34 or the fourth surface light-shielding member 32 and reach the linear image sensor 20, creating ghost noise. The rays L2 and L3 originate ghost noise and so are stray light.

Figure 6:
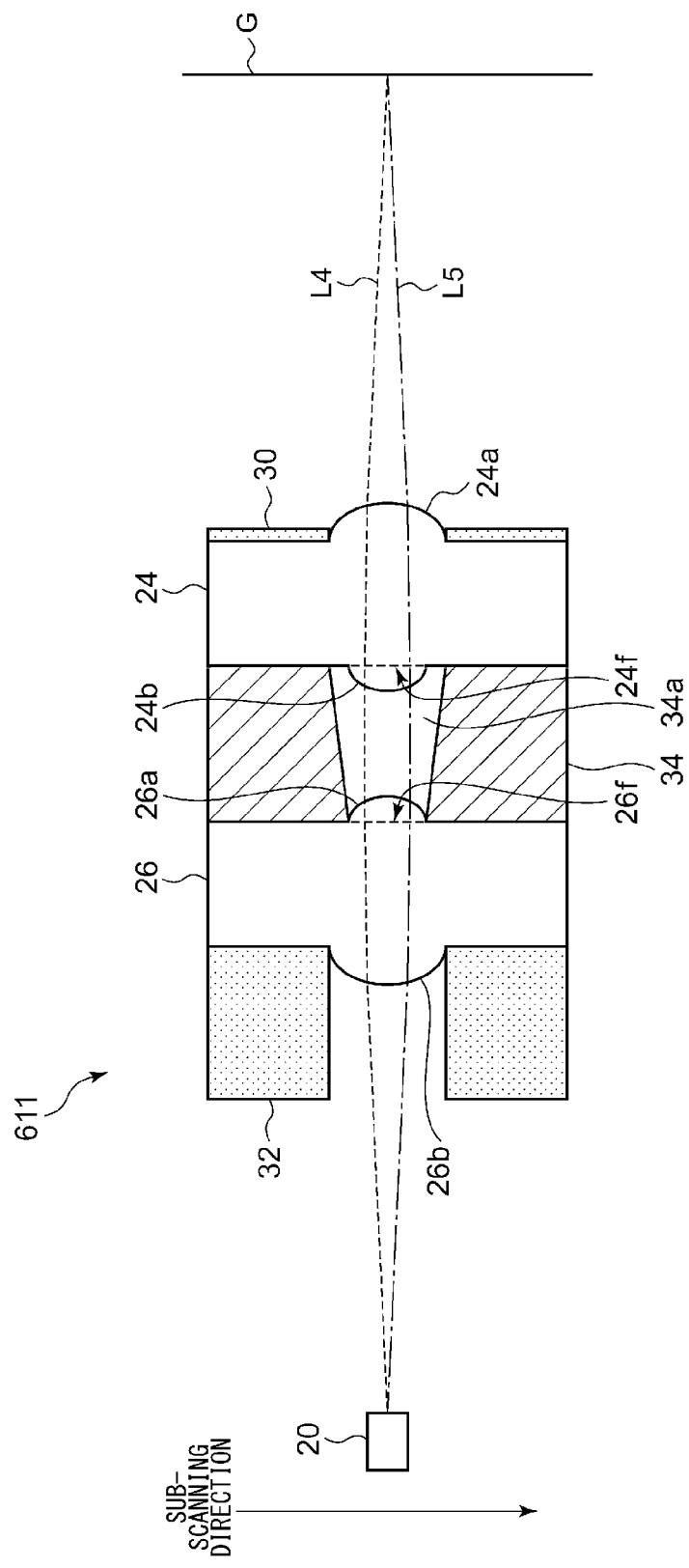
FIG. 6 shows a cross section of the erecting equal-magnification lens array plate according to the comparative embodiment in the sub-scanning direction.

FIG. 6 shows a cross section of the erecting equal-magnification lens array plate 611 according to the comparative embodiment in the sub-scanning direction. FIG. 6 shows optical paths of a ray L4 (broken line) and a ray L5 (chain line). L4 and L5 in FIG. 6 represent the extent of the rays L2 and L3 in FIG. 5 in the sub-scanning direction and represent stray light that leave the document G, pass through the first and second lens array plates 24 and 26, and reach the linear image sensor 20. As known from FIGS. 5 and 6, the erecting equal-magnification lens array plate 611 according to the comparative embodiment produces stray light that cannot be shielded merely by providing the intermediate light-shielding member 34.

Figure 7:
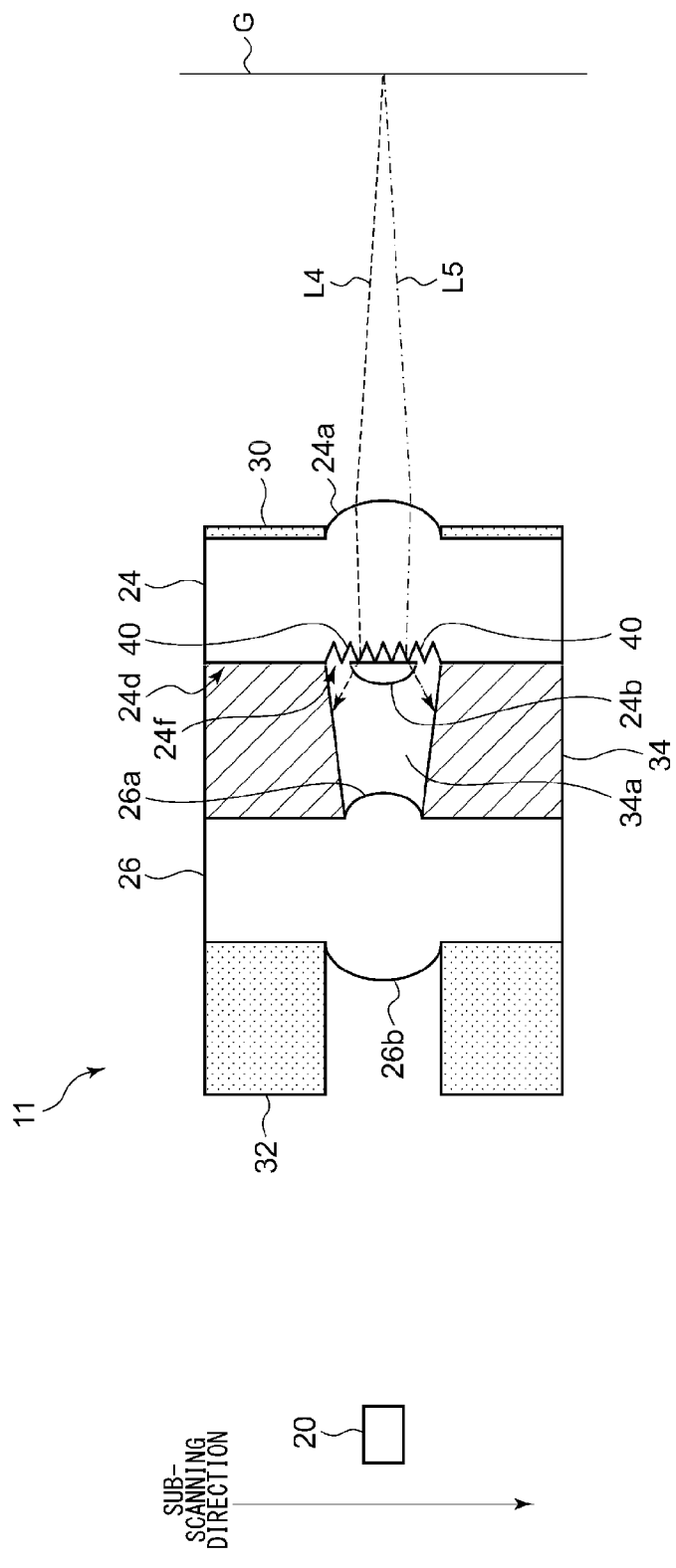
FIG. 7 shows the operation of the erecting equal-magnification lens array plate according to the embodiment.

FIG. 7 shows the operation of the erecting equal-magnification lens array plate 11 according to the embodiment. FIG. 7 is a cross section of the erecting equal-magnification lens array plate 11 along A-A in FIG. 2. As in FIG. 6, FIG. 7 also shows optical paths of the ray L4 (broken line) and the ray L5 (chain line).

As shown in FIG. 7, the erecting equal-magnification lens array plate 11 according to the embodiment is configured such that the rays L4 and L5 are deflected in the sub-scanning direction of the erecting equal-magnification lens array plate 11 by the V grooves 40 formed in the second surface inter-lens area 24f. The rays L4 and L5 deflected by the V grooves 40 are absorbed or at least attenuated by the intermediate light-shielding member 34 and so do not reach the linear image sensor 20. In other words, according to the erecting equal-magnification lens array plate 11 of the embodiment, stray light that cannot be shielded in the erecting equal-magnification lens array plate 611 according to the comparative embodiment can be shielded. Consequently, an erect equal-magnification image with higher quality in which ghost noise is reduced more successfully than the erecting equal-magnification lens array plate 611 according to the comparative embodiment can be formed.

As shown in FIG. 6, the optical path of the stray light originating ghost noise is similar to that of the imaging light except that the stray light passes through the second surface inter-lens area 24f and the third surface inter-lens area 26f. Therefore, the width of the second surface inter-lens area 24f in the sub-scanning direction through which the stray light could pass does not exceed the aperture size of the first lens 24a. Accordingly, as shown in FIG. 3, the width W1 of the V grooves 40 in the sub-scanning direction need only be equal to or more than the aperture size D1 of the first lens 24a. The aperture size D1 of the first lens 24a is equal to the hole diameter of the first surface through hole 30a of the first surface light-shielding member 30.

The V grooves need be provided in an inter-lens area located on the side where the hole diameter of the intermediate through hole 34a is larger (the second surface inter-lens area 24f in the case of the embodiment). If the intermediate light-shielding member 34 is displaced from where it should be during manufacturing, the third surface inter-lens area 26f of the third surface 26c, where no V grooves are provided, is not completely covered by the intermediate light-shielding member 34, exposing a flat surface. This might create ghost noise. For this reason, it is desirable that the V grooves be formed both in the second surface 24d and the third surface 26c.

Figure 8:
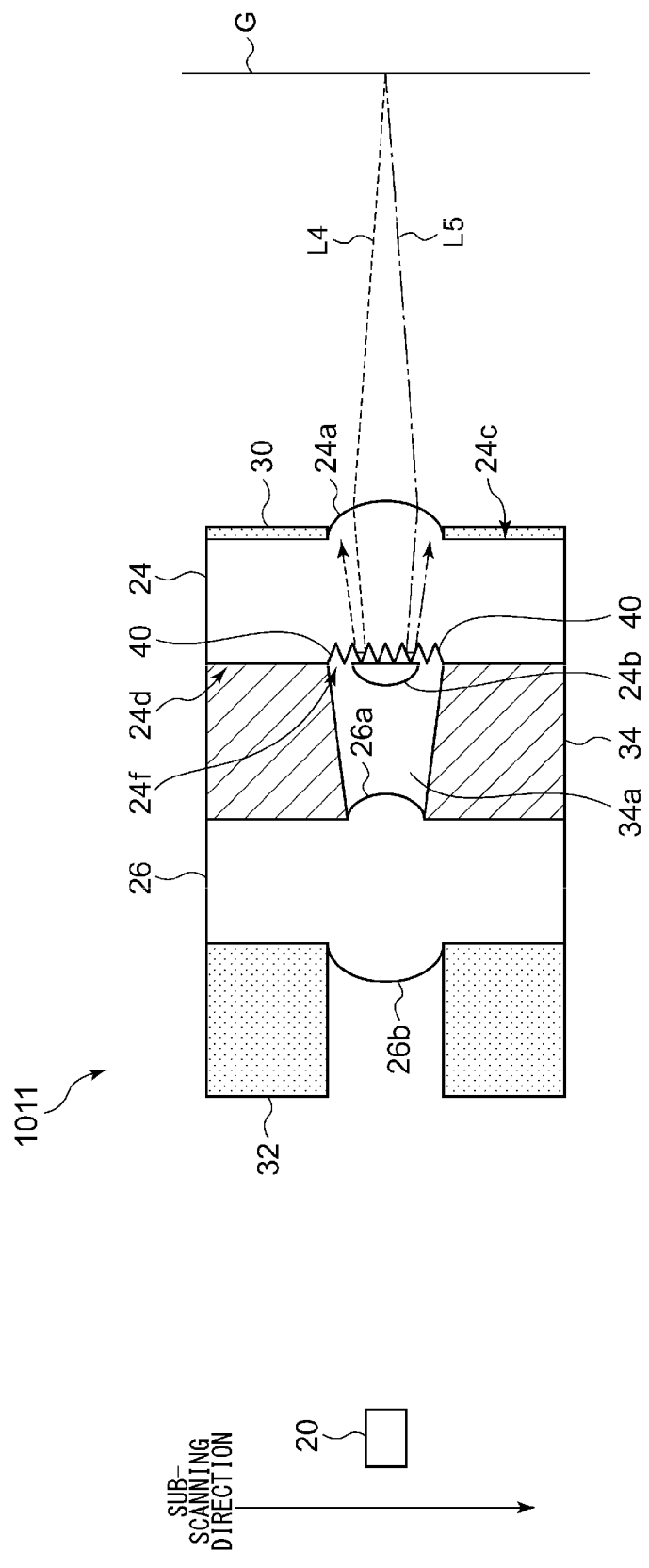
FIG. 8 shows the erecting equal-magnification lens array plate according to an alternative embodiment of the present invention.

FIG. 8 shows an erecting equal-magnification lens array plate 1011 according to an alternative embodiment of the present invention. As in FIG. 6, FIG. 8 shows optical paths of the ray L4 (broken line) and the ray L5 (chain line). The erecting equal-magnification lens array plate 1011 according to the alternative embodiment is configured such that the V grooves 40 are formed to cause the ray incident on the second surface inter-lens area 24f to be reflected toward the first surface 24c. By adjusting the angle of inclination of the slope of the V grooves 40, the rays L4 and L5 incident on the second surface inter-lens area 24f can be reflected toward the first surface 24c. According to the alternative embodiment, stray light that cannot be shielded in the erecting equal-magnification lens array plate 611 according to the comparative embodiment can be shielded. Consequently, an erect equal-magnification image with higher quality in which ghost noise is reduced more successfully than the erecting equal-magnification lens array plate 611 according to the comparative embodiment can be formed. In further accordance with the alternative embodiment, the stray light can be directed in a direction opposite to the linear image sensor 20. Therefore, the stray light is more properly prevented from being incident on the linear image sensor 20 so that ghost noise is more successfully reduced.

Figure 9:
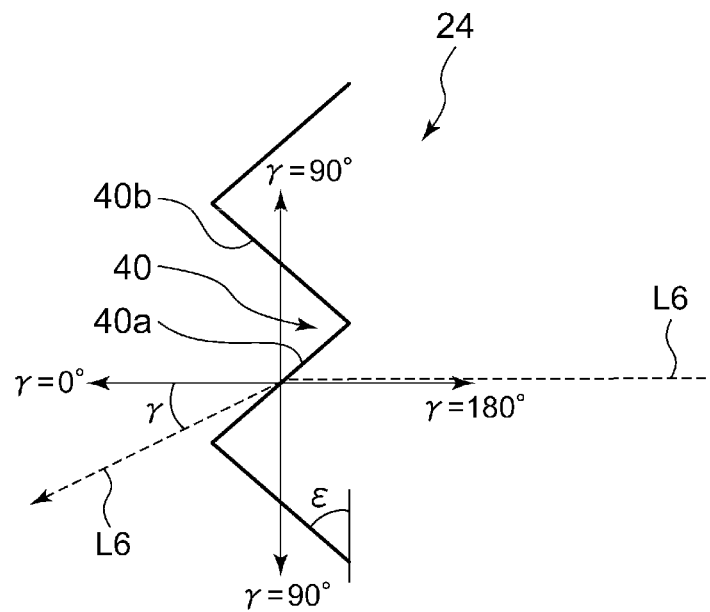
FIG. 9 shows a relationship between the angle of inclination of the slope of the V groove in the second surface and the angle of ray deflection.

FIG. 9 shows a relationship between the angle of inclination of the slope of the V grooves in the second surface and the angle of ray deflection. A discussion will be given of how a ray L6 (broken line) incident on the V groove 40, which is formed to have an isosceles triangle cross section, at an angle of 0° is deflected. The ray having an angle of incidence of 0° means a ray perpendicularly incident on the erecting equal-magnification lens array plate. As shown in FIG. 9, the angle formed by the slope of the V groove 40 and the surface parallel to the first lens array plate 24 will be defined as an angle of inclination $\epsilon$. The V groove 40 shown in FIG. 9 is formed such that the angle of inclination $\epsilon$ of one of the slopes 40a is equal to the angle of inclination $\epsilon$ of the other slope 40b. The angle formed by the line perpendicular to the first lens array plate 24 and the ray L6 leaving the slope of the V groove 40 will be defined as an angle of deflection $\gamma$ of the ray L6. For example, if the ray L6 leaves the first lens array plate 24 perpendicularly to the plate, the angle of deflection $\gamma=0°$. If the ray L6 leaves the first lens array plate 24 parallel to the plate, the angle of deflection $\gamma=90°$. If the ray L6 is reflected perpendicularly to the first lens array plate 24, the angle of deflection $\gamma=180°$. It will be assumed here that the refractive index of the first lens array plate 24 is 1.53. In this case, the critical angle $\theta c$ of the slope of the V groove 40 will be 40.8°.

Figure 10:
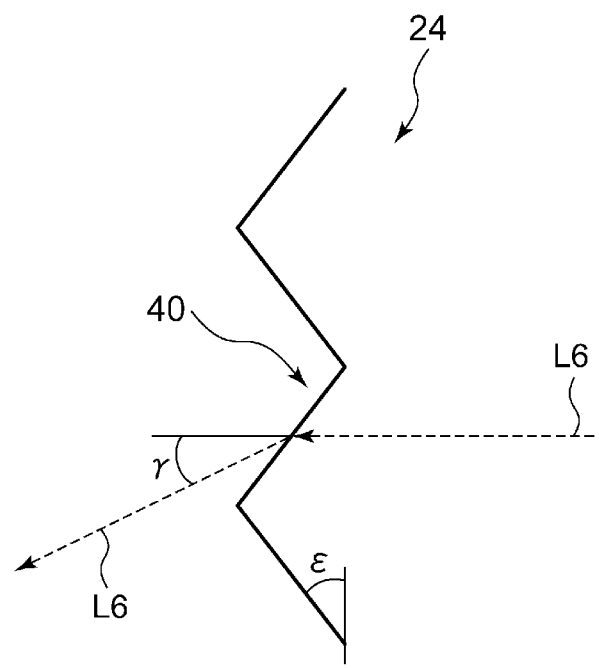
FIG. 10 shows an optical path occurring when the angle of inclination $\epsilon$ of the slope of the V groove in the second surface is equal to or less than the critical angle $\theta c$.

FIG. 10 shows an optical path occurring when the angle of inclination $\epsilon$ of the slope of the V groove in the second surface is equal to or less than the critical angle $\theta c$. In this case, the ray L6 incident on the slope of the V groove 40 is refracted by the slope of the V groove 40 and is directed toward the second lens array plate, as shown in FIG. 10.

Figure 11:
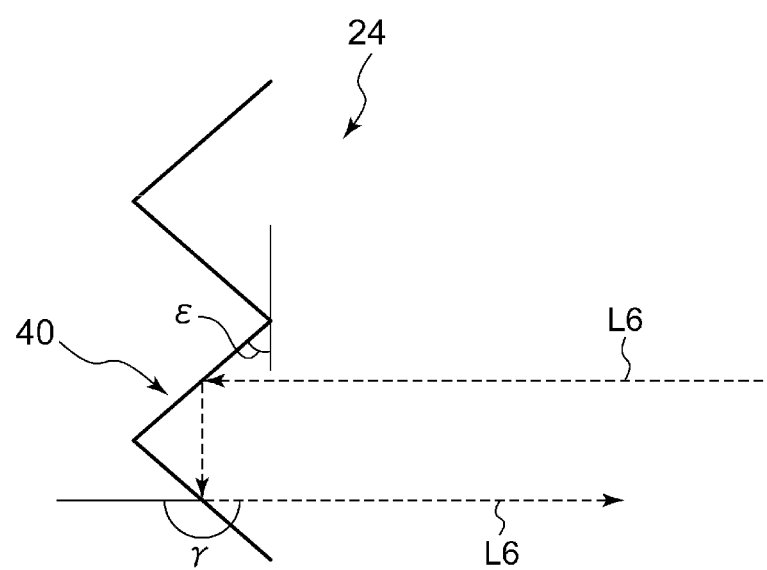
FIG. 11 shows an optical path occurring when the angle of inclination $\epsilon$ of the slope of the V groove in the second surface is more than the critical angle $\theta c$.

FIG. 11 shows an optical path occurring when the angle of inclination $\epsilon$ of the slope of the V groove in the second surface is more than the critical angle $\theta c$. FIG. 11 shows an optical path occurring when the angle of inclination $\epsilon=45°$. In this case, the ray L6 totally reflected by the slope of the V groove 40 is totally reflected again by the slope of the adjacent V groove 40 before being directed toward the first surface (angle of deflection γ=180°. The optical path of FIG. 11 results because the angle of inclination ε=45°. The optical path of the ray L6 totally reflected by the slope of the V groove 40 varies depending on the value of the angle of inclination ε. For example, if the angle of inclination ε=70°, the ray L6 totally reflected by the slope of a given V groove 40 is refracted by the slope of the adjacent V groove 40 before being directed to the second lens array plate.

Figure 12:
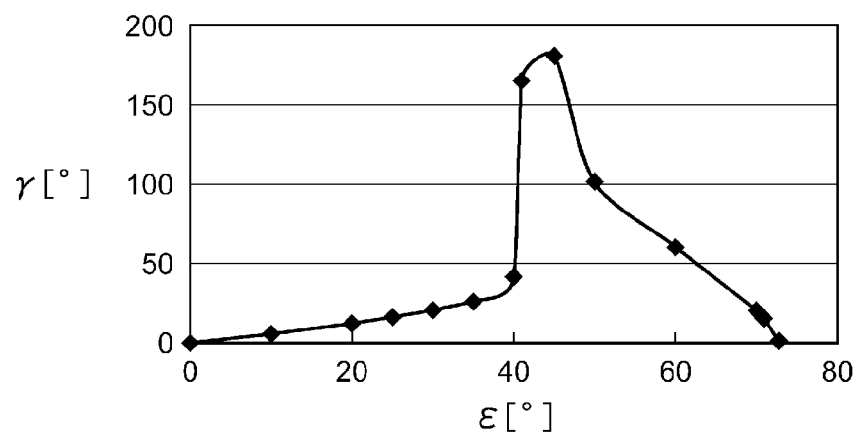
FIG. 12 shows a relationship between the angle of inclination $\epsilon$ of the slope of the V groove in the second surface and the angle of ray deflection $\gamma$.

FIG. 12 shows a relationship between the angle of inclination ε of the slope of the V groove in the second surface and the angle of ray deflection γ. As described with reference to FIG. 8, ghost noise is more successfully reduced if the ray L6 is reflected toward the first surface (i.e., if the angle of deflection≥90°. Ghost noise is most successfully reduced when the angle of deflection γ=180°. Therefore, it is most desirable to ensure that the angle of inclination ε of the V groove 40 is 45°. As shown in FIG. 12, the angle of deflection γ varies depending on the value of the angle of inclination ε. The range of the angle of deflection γ effective to reduce ghost noise varies depending on the lens design. Therefore, the angle of inclination ε may be appropriately determined in accordance with the lens design.

Figure 13:
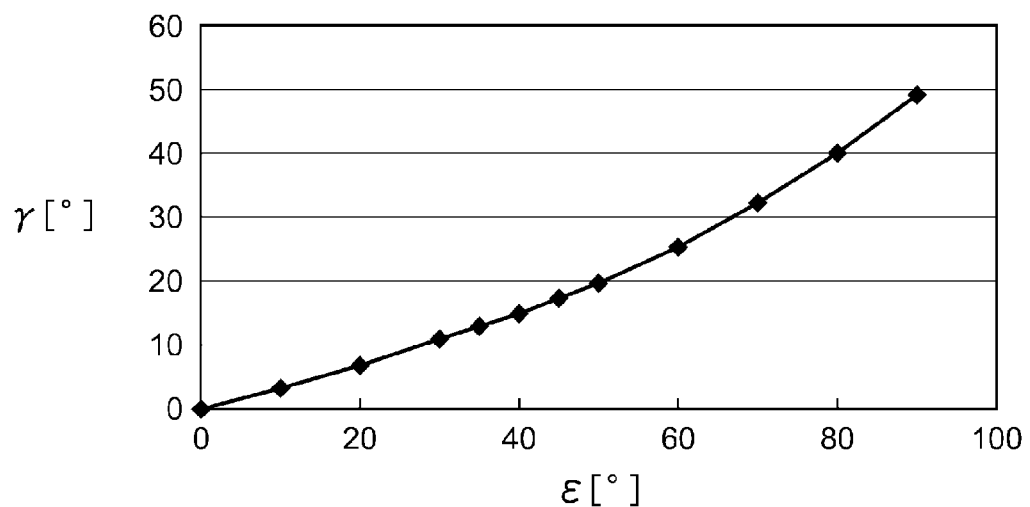
FIG. 13 shows a relationship between the angle of inclination $\epsilon$ of the slope of the V groove in the third surface and the angle of ray deflection $\gamma$.

FIG. 13 shows a relationship between the angle of inclination ε of the slope of the V groove in the third surface and the angle of ray deflection γ. In this case, the ray enters the second lens array plate via air so that the ray is not totally reflected. As shown in FIG. 13, as the angle of inclination ε of the slope of the V groove in the third surface is increased, the angle of deflection γ is also increased. In the case of the V groove in the third surface, too, the range of the angle of deflection γ effective to reduce ghost noise varies depending on the lens design. Therefore, the angle of inclination ε may be appropriately determined in accordance with the lens design.

FIGS. 9-13 depict cases where the angle of inclination of one of the slopes of the V groove is equal to the angle of inclination of the other slope. However, one of the slopes of the V groove need not be equal to the other slope. For example, one of the slopes of the V groove may differ from the other slope in the angle of inclination, depending on the position of the V groove. Further, the angle of inclination of the V grooves may not be uniform. The angle may differ depending on the position of the V groove. By adjusting the angle of inclination appropriately depending on the position where the V groove is located, ghost noise is more suitably reduced.

In the erecting equal-magnification lens array plate 11 shown in FIG. 3, the second surface 24d is formed with the V grooves 40. However, both the second surface and the third surface may be formed with V grooves. In this case, the stray light is deflected at both the second and third surfaces so that ghost noise is more successfully reduced. In this case, however, the width W1 of the V groove in the sub-scanning direction is desirably equal to the aperture size D1 of the first lens 24a. This is because the V grooves in the second surface 24d and/or the third surface 26c might create additional ghost.

In the embodiment of FIG. 3, the first surface light-shielding member 30 is a member of a film form, and the fourth surface light-shielding member 32 is a member of a plate form. Alternatively, both the first surface light-shielding member 30 and the fourth surface light-shielding member 32 may be a member of a plate form. By increasing the height of the light-shielding member thus, ghost noise is more successfully reduced. Still alternatively, the first surface light-shielding member 30 may be a member of a plate form, and the fourth surface light-shielding member 32 may be a member of a film form. Still alternatively, the first surface through hole 30a of the first surface light-shielding member 30 may be formed as a circular truncated cone. In other words, the diameter of the opening of the first surface through hole 30a facing the document and that of the opening at the first surface may be different. Still alternatively, the fourth surface through hole 32a of the fourth surface light-shielding member 32 may be formed as a circular truncated cone. In other words, the diameter of the opening of the fourth surface through hole 32a facing the image plane and that of the opening at the fourth surface may be different.

Figure 14:
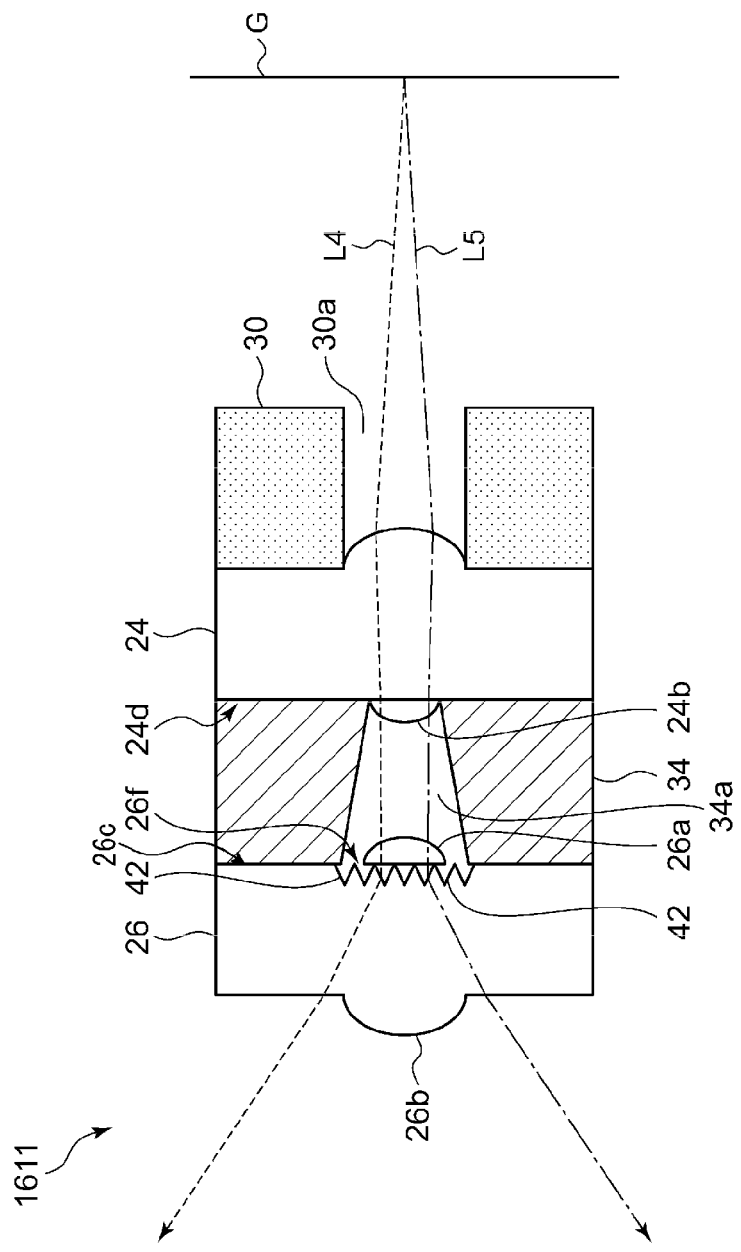
FIG. 14 shows the erecting equal-magnification lens array plate according to a second alternative embodiment of the present invention.

FIG. 14 shows an erecting equal-magnification lens array plate 1611 according to a second alternative embodiment of the present invention. Further, the intermediate through hole 34a of the intermediate light-shielding member 34 in the erecting equal-magnification lens array plate 1611 of the second alternative embodiment is formed as a circular truncated cone such that the hole diameter is progressively larger in an inversely tapered fashion away from the second surface 24d toward the third surface 26c. In the second alternative embodiment, a plurality of V grooves 42 are formed in the third surface inter-lens area 26f of the third surface 26c, which is an inter-lens area located on the side where the hole diameter of the intermediate through hole 34a is larger. The second surface inter-lens area of the second surface 24d is formed as a flat surface. In the erecting equal-magnification lens array plate 1611, the first surface light-shielding member 30 is a member of a plate form and the fourth surface light-shielding member is removed.

As in FIG. 6, FIG. 14 shows optical paths of the ray L4 (broken line) and the ray L5 (chain line). In the erecting equal-magnification lens array plate 1611 according to the second alternative embodiment, the rays L4 and L5 are deflected in the sub-scanning direction of the erecting equal-magnification lens array plate 1611 by the V grooves 42 formed in the third surface inter-lens area 26f, as shown in FIG. 14. The rays L4 and L5 deflected by the V grooves 42 travel away from the linear image sensor 20 after passing through the second lens array plate 26 and so are not incident on the linear image sensor 20. Therefore, by using the erecting equal-magnification lens array plate 1611 according to the second alternative embodiment, an erect equal-magnification image in which ghost noise is reduced can be formed without providing the fourth surface light-shielding member. Consequently, the number of components is reduced so that the erecting equal-magnification lens array plate can be implemented at a reduced cost.

In this embodiment, too, if the intermediate light-shielding member 34 is displaced from where it should be during manufacturing, the second surface inter-lens area of the second surface 24d, where no V grooves are provided, is not completely covered by the intermediate light-shielding member 34, exposing a flat surface. This might create ghost noise. For this reason, it is desirable that the V grooves be formed both in the second surface 24d and the third surface 26c.

In the erecting equal-magnification lens array plate 1611 shown in FIG. 14, the first surface light-shielding member 30 cannot be removed. In the erecting equal-magnification lens array plate 11 shown in FIG. 3, the first surface light-shielding member 30 cannot be removed. Unlike the linear image sensor 20, the document G has a large extent in the sub-scanning direction. Therefore, there are a plurality of paths for stray light traveling from the document G to the linear image sensor 20 so that stray light cannot be successfully prevented from entering the linear image sensor 20 merely by providing V grooves.

In the embodiment described above, it is assumed that the smaller of the diameters of the openings of the intermediate through hole 34a is equal to the lens diameter. For example, in the embodiment shown in FIG. 2, the diameter of the opening of the intermediate light-shielding through hole 34a at the third surface is equal to the lens diameter of the third lens 26a. This ensures that the third surface inter-lens area 26f is completely covered by the intermediate light-shielding member 34. In this structure, however, not much margin of error is allowed for assembling the third lenses 26a and the intermediate light-shielding member 34 with the result that the ease of assembly is impaired. For this reason, the smaller of the diameters of the openings of the intermediate through hole 34a may be slightly more than the lens diameter for the purpose of improving ease of assembly. In this case, a surface not covered by the intermediate light-shielding member 34 is created in both the second surface inter-lens area 24f and the third surface inter-lens area 26f. Ghost noise will be more efficiently removed by forming V grooves in both the second surface 24d and the third surface 26c.

In the embodiments described above, the intermediate light-shielding member 34 provided with the intermediate through hole 34a formed as a circular truncated cone is used. Where the requirement for removing flare noise is not so severe, the intermediate light-shielding member provided with a cylindrical intermediate through hole may be used. In this case, too, the diameter of the opening of the intermediate light-shielding through hole may be more than the lens diameter in order to avoid impairing the ease of assembly. In this case, ghost noise is removed to a certain extent by forming V grooves in either the second surface 24d or the third surface 26c. However, this creates a surface not covered by the intermediate light-shielding member 34 in both the second surface inter-lens area 24f and the third surface inter-lens area 26f. Therefore, ghost noise is more efficiently removed by forming V grooves in both the second surface 24d and the third surface 26c.

A description will now be given of exemplary embodiments of the present invention. A simulation of noise ratio was conducted in an exemplary embodiment and a comparative exemplary embodiment of the present invention. More specifically, a ray tracing simulation was conducted. The entirety of the erecting equal-magnification lens array plate is illuminated in the main scanning direction by a 90° Lambertian emission from a point light source. The amount of imaging light arriving at a specified point on the image plane is designated as the amount of imaging light transmitted. The amount of light arriving elsewhere is designated as the amount of light transmitted as noise. The illumination and calculation of the amount of light are conducted on a line extending in the main scanning direction. A noise ratio is defined as a sum of the amount of light transmitted as noise divided by a sum of the amount of imaging light transmitted.

Figure 15:
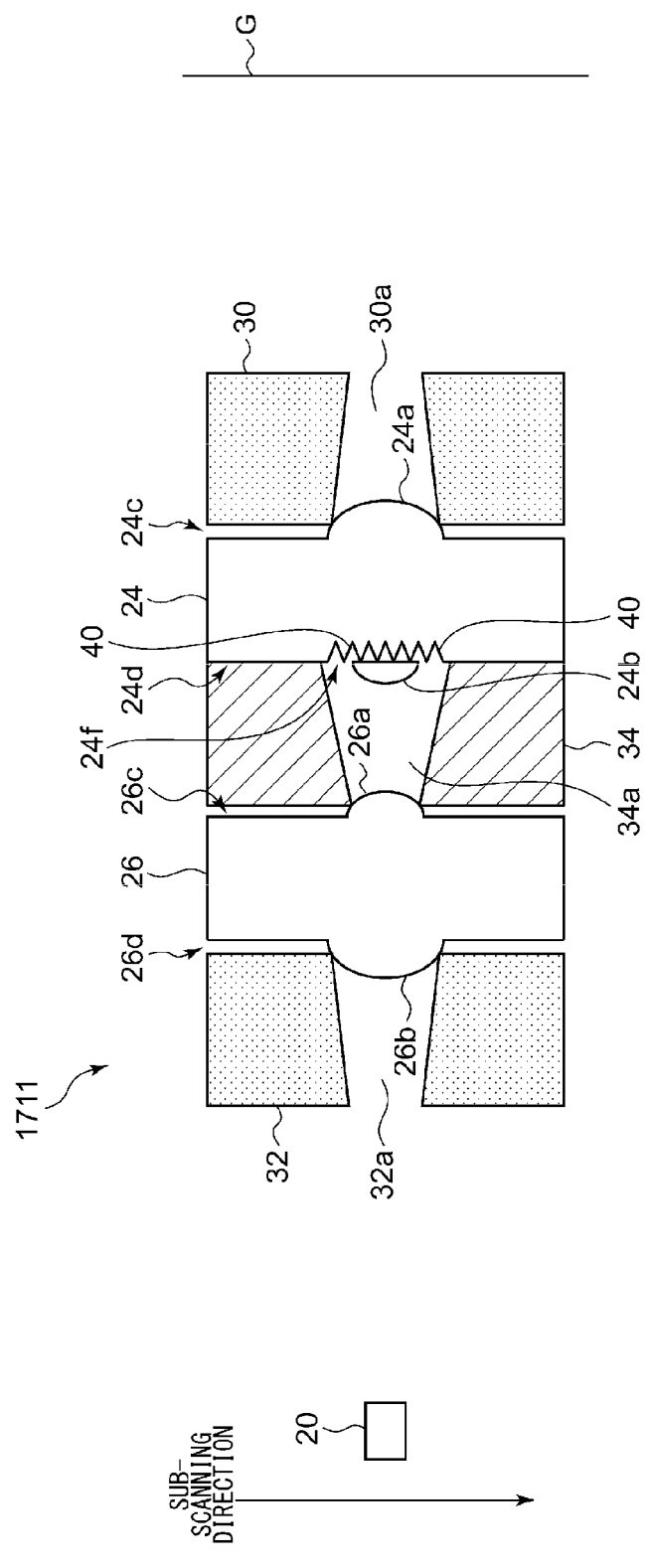
FIG. 15 shows the erecting equal-magnification lens array plate according to the exemplary embodiment of the present invention.

FIG. 15 shows an erecting equal-magnification lens array plate 1711 according to the exemplary embodiment of the present invention. As shown in FIG. 15, the erecting equal-magnification lens array plate 1711 is configured such that the second surface inter-lens area 24f is formed with a plurality of V grooves 40. The erecting equal-magnification lens array plate 1711 is configured such that the first surface light-shielding member 30, the fourth surface light-shielding member 32, and the intermediate light-shielding member 34 of a plate form are provided. The first surface through hole 30a, the fourth surface through hole 32a, and the intermediate through hole 34a are formed as a circular truncated cone. The erecting equal-magnification lens array plate according to the comparative exemplary embodiment differs from the exemplary embodiment in that a flat surface, instead of the V grooves 40, is formed in the second surface inter-lens area 24f.

The conditions for simulation common to the exemplary embodiment and the comparative exemplary embodiment are such that the conjugation length TC=9.9 mm, the thickness of the first and second lens array plates 24 and 26 (hereinafter, lens thickness)=1.05 mm, the pitch of arrangement of the first through fourth lenses (hereinafter, lens arrangement pitch) =0.7 mm, the lens diameter of the first lenses 24a=0.6 mm, the lens diameter of the second lenses 24b=0.4 mm, the lens diameter of the third lenses 26a=0.4 mm, the lens diameter of the fourth lenses 26b=0.6 mm, the gap between the first lens array plate 24 and the second lens array plate 26 (hereinafter, gap)=0.8 mm, the refractive index of the first and second lens array plates 24 and 26=1.53, the height of the first surface light-shielding member 30=0.7 mm, the height of the fourth surface light-shielding member 32=0.7 mm, the height of the intermediate light-shielding member 34=0.80 mm, the diameter of the opening of the first surface through hole 30a facing the document=0.45 mm, the diameter of the opening of the first surface through hole 30a at the first surface=0.51 mm, the diameter of the opening of the fourth surface through hole 32a facing the image plane=0.45 mm, the diameter of the opening of the fourth surface through hole 32a at the fourth surface=0.51 mm, the diameter of the opening of the intermediate through hole 34a at the second surface=0.65 mm, and the diameter of the opening of the intermediate through hole 34a at the third surface=0.35 mm.

FIG. 16 shows a result of simulation in the comparative exemplary embodiment and the exemplary embodiment. The shape of the V grooves of the exemplary embodiments is varied as in (1)-(4) below. The noise ratio is computed in the case where the total width of the V grooves in the sub-scanning direction W1=0.51 mm and in the case where W1=200 mm.

(1) V groove width=5 μm, angle of inclination ε=60°, V groove height=4.3 μm
(2) V groove width=5 μm, angle of inclination ε=45°, V groove height=2.5 μm
(3) V groove width=10 μm, angle of inclination ε=60°, V groove height=8.7 μm
(4) V groove width=10 μm, angle of inclination ε=45°, V groove height=5.0 μm The simulation result in the comparative exemplary embodiment shows that the noise ratio is 1.07% both when the total width of the V grooves in the sub-scanning direction W1=0.51 mm and when W1=200 mm. The simulation result in the exemplary embodiment shows that the noise ratio is reduced in all cases of (1)-(4) in comparison to the comparative exemplary embodiment, both when the total width of the V grooves in the sub-scanning direction W1=0.51 mm and when W1=200 mm. In particular, the noise ratio is 0.38% in (1) and (3), demonstrating that the ratio is reduced to about ⅓ in comparison to the comparative exemplary embodiment. The simulation result shows that the plurality of V grooves formed in the second surface inter-lens area are useful to further reduce ghost noise.

Figure 17:
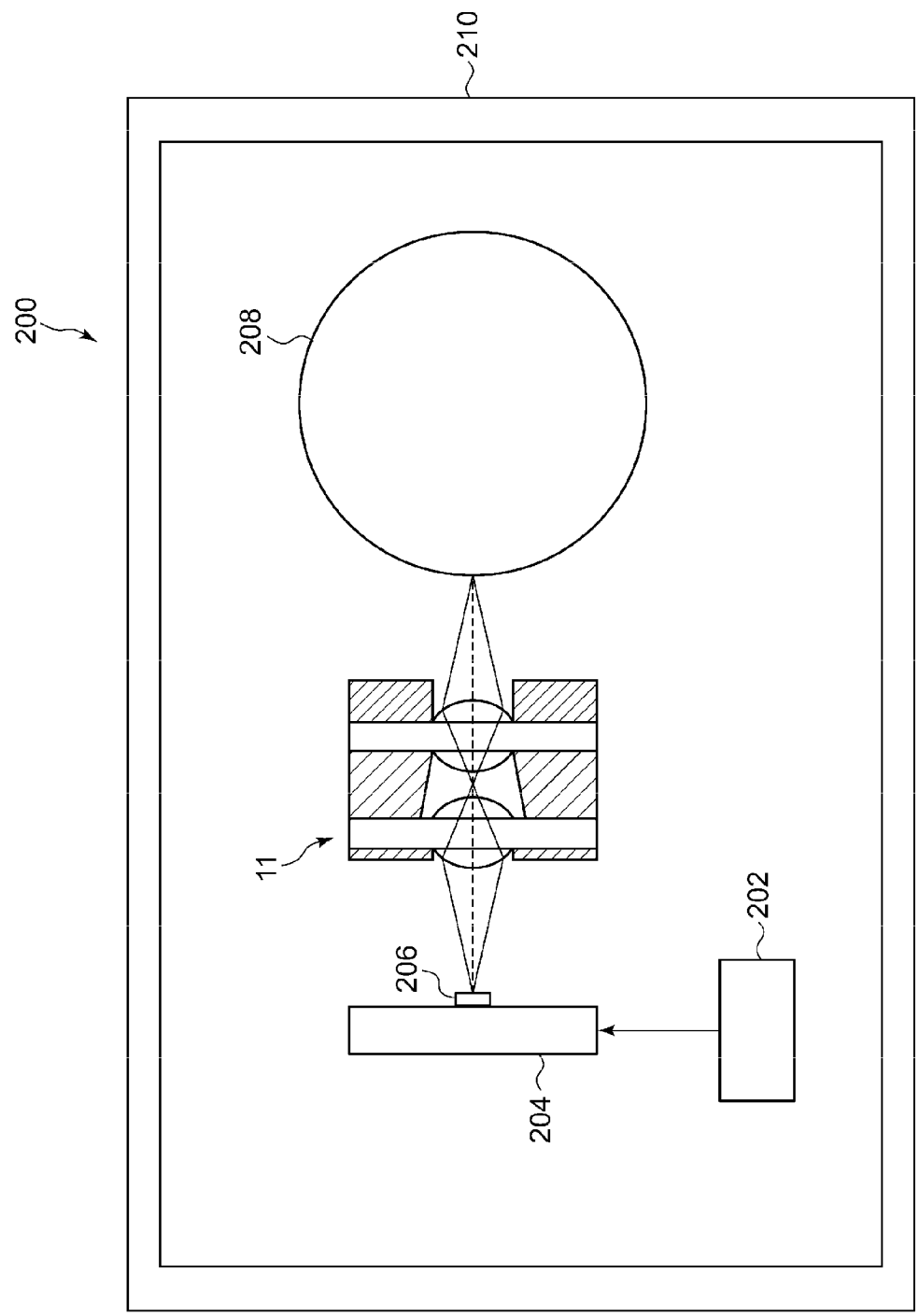
FIG. 17 shows the image writing device according to another embodiment of the present invention.

FIG. 17 shows an image writing device 200 according to another embodiment of the present invention. As shown in FIG. 17, the image writing device 200 comprises an LED array 206 comprising an array of a plurality of LED's, a substrate 204 on which the LED array 206 is mounted, a control unit 202 configured to control the LED array 206, the aforementioned erecting equal-magnification lens array plate 11 for condensing light emitted from the LED array 206, a photosensitive drum 208 for receiving the light transmitted through the erecting equal-magnification lens array plate 11, and a housing 210 for accommodating the components. In FIG. 17, the developer device, the transferring device, etc.

provided around the photosensitive drum 208 are omitted from the illustration. The explanation given above of the image reading device 100 also applies to the image writing device by replacing the document G of the image reading device 100 shown in FIG. 1 by the photosensitive drum 208 in the image writing device 200 and further replacing the linear image sensor 20 of the image reading device 100 by the LED array 206 in the image writing device 200.

The image writing device 200 is provided with an LED print head which uses LED's as light sources. When an LED print head is used, pixels correspond one to one to light-emitting sources so that no mechanisms for scanning are necessary. Therefore, the size and weight of the device can be reduced as compared with a laser raster output scanner (ROS) system in which a laser light source and a polygon mirror are combined.

In the related art, a rod lens array is used as an erecting equal-magnification lens array plate in a device in which an LED print head is used. By using the erecting equal-magnification lens array plate 11 according to the present invention, the cost of the image writing device 200 can be reduced. By using the erecting equal-magnification lens array plate 11 according to the present invention, a high-quality image in which flare noise is reduced can be formed on the photosensitive drum 208.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described, lenses on the respective lens surfaces are arranged in a single row in the main scanning direction. Alternatively, lenses may be arranged in two or more rows in the main scanning direction or arranged in a square array to reduce ghost noise equally.

What is claimed is:

1. An erecting equal-magnification lens array plate comprising:
    a first lens array plate provided with a plurality of first lenses systematically arranged on a first surface and a plurality of second lenses systematically arranged on a second surface opposite to the first surface; and
    a second lens array plate provided with a plurality of third lenses systematically arranged on a third surface and a plurality of fourth lenses systematically arranged on a fourth surface opposite to the third surface,
    wherein the first lens array plate and the second lens array plate form a stack such that the second surface and the third surface face each other to ensure that a combination of the lenses aligned with each other form a coaxial lens system, and an erect equal-magnification image of an object on the first surface side is formed on an image plane facing the fourth surface,
    the erecting equal-magnification lens array plate further comprising an intermediate light-shielding member provided with a plurality of intermediate through holes corresponding to the second and third lenses and provided between the first lens array plate and the second lens array plate such that the intermediate through holes are located directly opposite to the corresponding second and third lenses, and
    a plurality of V grooves are formed in an area between adjacent second lenses on the second surface and/or an area between adjacent third lenses on the third surface.

2. The erecting equal-magnification lens array plate according to claim 1, wherein the V grooves are formed to extend substantially parallel to the main scanning direction of the erecting equal-magnification lens array plate.

3. The erecting equal-magnification lens array plate according to claim 1, wherein the total width of the V grooves in the sub-scanning direction is equal to or more than an aperture size of the first lenses.

4. The erecting equal-magnification lens array plate according to claim 1, wherein the adjacent V grooves are contiguous with each other at their ends in the sub-scanning direction.

5. An optical scanning unit comprising:
    a linear light source configured to illuminate an original to be read;
    the erecting equal-magnification lens array plate according to claim 1 configured to condense light reflected by the original to be read; and
    a linear image sensor configured to receive light transmitted by the erecting equal-magnification lens array plate.

6. An image reading device comprising:
    the optical scanning unit according to claim 5; and
    an image processing unit configured to process an image signal detected by the optical scanning unit.

7. An image writing device comprising:
    an LED array comprising an array of a plurality of LED's;
    the erecting equal-magnification lens array plate according to claim 1 for condensing light emitted from the LED array; and
    a photosensitive drum for receiving the light transmitted through the erecting equal-magnification lens array plate.

8. An erecting equal-magnification lens array plate comprising:
    a first lens array plate provided with a plurality of first lenses systematically arranged on a first surface and a plurality of second lenses systematically arranged on a second surface opposite to the first surface; and
    a second lens array plate provided with a plurality of third lenses systematically arranged on a third surface and a plurality of fourth lenses systematically arranged on a fourth surface opposite to the third surface,
    wherein the first lens array plate and the second lens array plate form a stack such that the second surface and the third surface face each other to ensure that a combination of the lenses aligned with each other form a coaxial lens system, and an erect equal-magnification image of an object on the first surface side is formed on an image plane facing the fourth surface,
    the erecting equal-magnification lens array plate further comprising an intermediate light-shielding member provided with a plurality of intermediate through holes corresponding to the second and third lenses and provided between the first lens array plate and the second lens array plate such that the intermediate through holes are located directly opposite to the corresponding second and third lenses,
    wherein the intermediate through hole is formed such that the hole diameter is progressively smaller in a tapered fashion away from the second surface toward the third surface, and
    a plurality of V grooves are formed in an area between adjacent second lenses on the second surface.

9. The erecting equal-magnification lens array plate according to claim 8, wherein the V grooves are formed to extend substantially parallel to the main scanning direction of the erecting equal-magnification lens array plate.

10. The erecting equal-magnification lens array plate according to claim 8, wherein the total width of the V grooves in the sub-scanning direction is equal to or more than an aperture size of the first lenses.

11. The erecting equal-magnification lens array plate according to claim 8, wherein the adjacent V grooves are contiguous with each other at their ends in the sub-scanning direction.

12. An optical scanning unit comprising:
a linear light source configured to illuminate an original to be read;
the erecting equal-magnification lens array plate according to claim 8 configured to condense light reflected by the original to be read; and
a linear image sensor configured to receive light transmitted by the erecting equal-magnification lens array plate.

13. An image reading device comprising:
the optical scanning unit according to claim 12; and
an image processing unit configured to process an image signal detected by the optical scanning unit.

14. An image writing device comprising:
an LED array comprising an array of a plurality of LED's;
the erecting equal-magnification lens array plate according to claim 8 for condensing light emitted from the LED array; and
a photosensitive drum for receiving the light transmitted through the erecting equal-magnification lens array plate.

15. An erecting equal-magnification lens array plate comprising:
a first lens array plate provided with a plurality of first lenses systematically arranged on a first surface and a plurality of second lenses systematically arranged on a second surface opposite to the first surface; and
a second lens array plate provided with a plurality of third lenses systematically arranged on a third surface and a plurality of fourth lenses systematically arranged on a fourth surface opposite to the third surface,
wherein the first lens array plate and the second lens array plate form a stack such that the second surface and the third surface face each other to ensure that a combination of the lenses aligned with each other form a coaxial lens system, and an erect equal-magnification image of an object on the first surface side is formed on an image plane facing the fourth surface,
the erecting equal-magnification lens array plate further comprising an intermediate light-shielding member provided with a plurality of intermediate through holes corresponding to the second and third lenses and provided between the first lens array plate and the second lens array plate such that the intermediate through holes are located directly opposite to the corresponding second and third lenses,
wherein the intermediate through hole is formed such that the hole diameter is progressively larger in an inversely tapered fashion away from the second surface toward the third surface, and
a plurality of V grooves are formed in an area between adjacent third lenses on the third surface.

16. The erecting equal-magnification lens array plate according to claim 15, wherein the V grooves are formed to extend substantially parallel to the main scanning direction of the erecting equal-magnification lens array plate.

17. The erecting equal-magnification lens array plate according to claim 15, wherein the total width of the V grooves in the sub-scanning direction is equal to or more than an aperture size of the first lenses.

18. The erecting equal-magnification lens array plate according to claim 15, wherein the adjacent V grooves are contiguous with each other at their ends in the sub-scanning direction.

19. An optical scanning unit comprising:
a linear light source configured to illuminate an original to be read;
the erecting equal-magnification lens array plate according to claim 15 configured to condense light reflected by the original to be read; and
a linear image sensor configured to receive light transmitted by the erecting equal-magnification lens array plate.

20. An image reading device comprising:
the optical scanning unit according to claim 19; and
an image processing unit configured to process an image signal detected by the optical scanning unit.

21. An image writing device comprising:
an LED array comprising an array of a plurality of LED's;
the erecting equal-magnification lens array plate according to claim 15 for condensing light emitted from the LED array; and
a photosensitive drum for receiving the light transmitted through the erecting equal-magnification lens array plate.

* * * * *